United States Patent

Tong et al.

[11] Patent Number: 5,367,775
[45] Date of Patent: Nov. 29, 1994

[54] SKIMMING LADLE

[76] Inventors: Sidney Tong, 5 Anderson Ave., North Babylon, N.Y. 11703; Shu W. Lee, 90 Knob Hill Rd., Morganville, N.J. 07751

[21] Appl. No.: 158,785
[22] Filed: Dec. 1, 1993
[51] Int. Cl.⁵ .............................................. A47J 43/28
[52] U.S. Cl. ............................................ 30/324; 30/326
[58] Field of Search ................. 30/141, 142, 147–150, 30/322–328

[56] References Cited

U.S. PATENT DOCUMENTS 2,334,535 11/1943 Bandell ........................... 30/141 X
4,839,965 6/1989 Levie .................................. 30/324
5,005,294 4/1991 Roberts et al. ................... 30/324

Primary Examiner—Douglas D. Watts
Attorney, Agent, or Firm—Michael I. Kroll

[57] ABSTRACT

A skimming ladle is provided, which consists of a bowl that is capable of holding a liquid with a fatty oil therein. A spout is formed on one side of the bowl. a handle that is fixed to the bowl extends therefrom for manipulation of the bowl. A structure in the bowl is for guiding the liquid away from the fatty oil when the liquid is poured out of the spout, so that the liquid will be free of the fatty oil when exiting the spout.

2 Claims, 2 Drawing Sheets

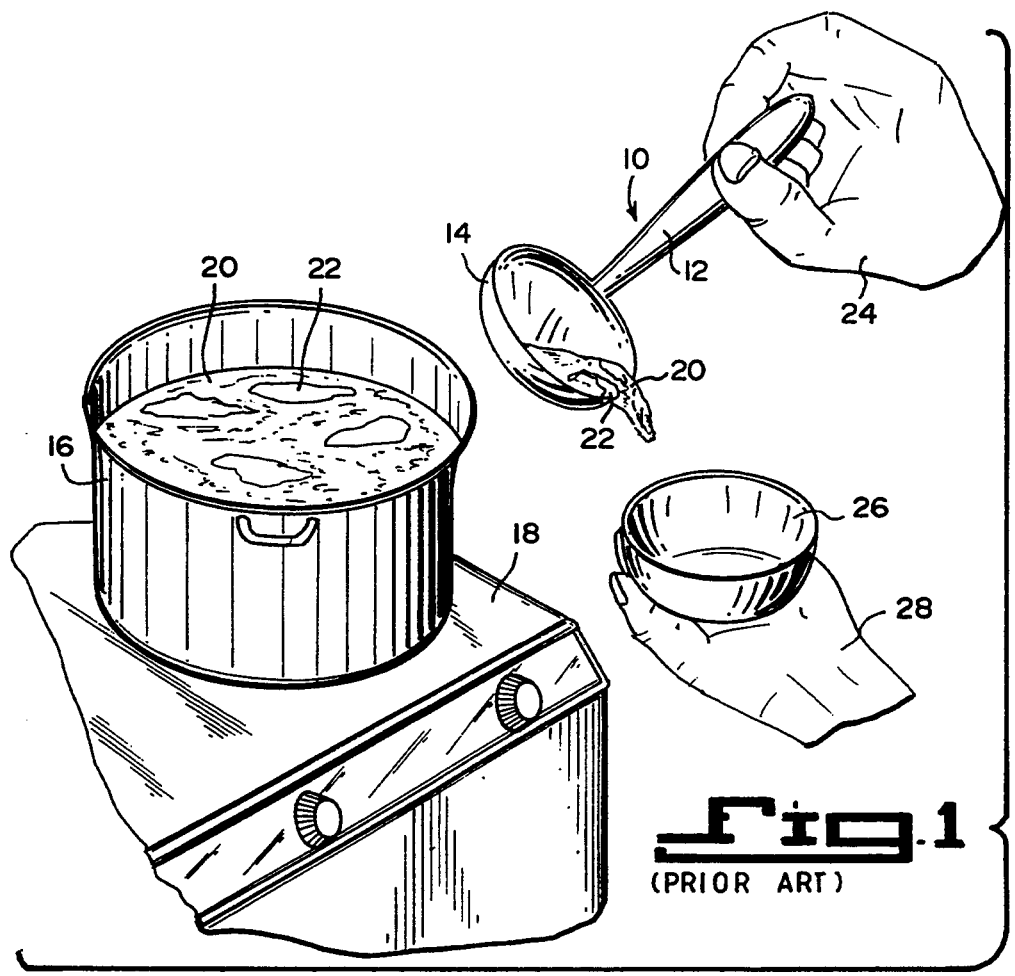
Fig. 1
(PRIOR ART)
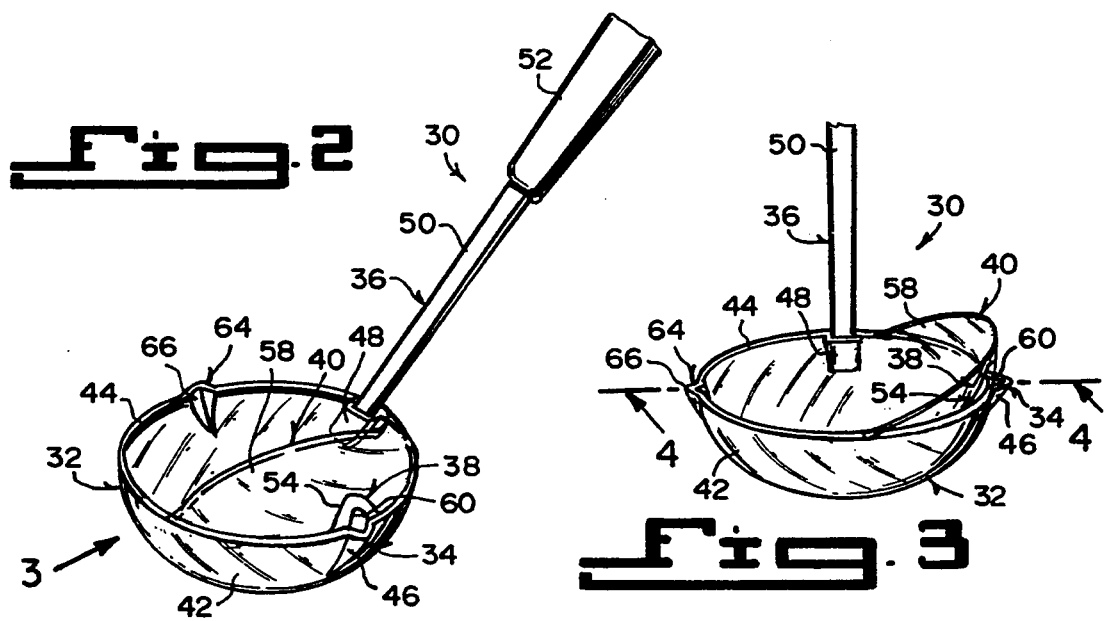
Fig. 2
Fig. 3

SKIMMING LADLE

BACKGROUND OF THE INVENTION

1. Field of the Invention

The instant invention relates generally to ladles and more specifically it relates to a skimming ladle.

2. Description of the Prior Art

Numerous ladles have been provided in prior art. For example, U.S. Pat. Nos. 4,040,185 to Jacobi; 4,438,564 to Ashton; 4,825,551 to Sherblom; 4,839,965 to Levie; 5,005,294 to Roberts and 5,077,900 to Jamentz all are illustrative of such prior art. While these units may be suitable for the particular purpose to which they address, they would not be as suitable for the purposes of the present invention as heretofore described.

A ladle for serving soup is provided, which consists of a substantially hemispherical bowl with a handle. An inner boat-shaped receptacle, which has a generally V-shaped cross-section and tapers toward each of its ends, is supported by the bowl in a generally inverted position relative to the bowl, with one side of the boat-shaped receptacle generally conforming to and slightly spaced from the inner surface of the bowl at one side of the bowl. The space between the side of the boat-shaped receptacle and the inner surface of the bowl forms a pouring passage extending from an inlet slot between the edge of such receptacle and the inner surface of the bowl to a discharge slot between the edge of the bowl and the bottom of such receptacle.

An improved egg scoop or spoon is suitable for handling hot boiled eggs. The spoon bowl is itself egg shaped and is constructed so as to be easily positionable around an egg. The bowl surrounds and firmly retains an egg and provides for the drainage of fluids from the egg without its retention within the spoon bowl. The bowl also allows the ready floatation of an egg from the spoon bowl when presented to a body of fluid.

A strainer ladle which comprises an outer ladle having an unperforated bowl and a handle, an inner ladle having a perforated bowl which is nested within the unperforated bowl and a handle which is slideably mounted on the handle of the outer ladle. The perforated bowl can be moved between a closed position in which two bowls are nested to an open position in which the two bowls are spaced from each other.

A skimmer/separator ladle has a handle and a spoon integral with the handle. The spoon has a spout at one end and a container section at the other end. There is provided a separator gate vertically and removably mounted in the spoon between the spout and the container section. The gate has a concave bottom so as to define a liquid passage between it and the bottom of the ladle.

A skimmer/separator ladle has a handle and a bowl or spoon integral with the handle. The bowl has a lip at its upper edge forming a spout defining one end of the bowl. The rest of the bowl constitutes a container section, and a separator gate removably mounted in the bowl between the spout and the container section. The gate has a concave bottom, so as to define a liquid passage between it and the bottom of the ladle.

A fat skimmer in the form of a ladle is provided, having a deep vessel bowl with a rim. There are ports about the rim for the transfer of surrounding fatty liquid into the vessel. This is determined by manipulation controlled by a locator associated with the rim.

SUMMARY OF THE INVENTION

A primary object of the present invention is to provide a skimming ladle that will overcome the shortcomings of the prior art devices.

Another object is to provide a skimming ladle that enables the separation of a liquid from a fatty oil when the liquid is being poured out of a spout on a bowl.

An additional object is to provide a skimming ladle that will prevent the accidental spillage of the fatty oil from the bowl, when the liquid is being poured out of the spout.

A further object is to provide a skimming ladle that is simple and easy to use.

A still further object is to provide a skimming ladle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the prior art being used to pour hot fatty soup into a cup.

FIG. 2 is a side perspective view of the instant invention.

FIG. 3 is a front perspective view with parts broken away taken in the direction of arrow 3 in FIG. 2.

DETAILED DESCRIPTION OF THE PREFERRED EMBODIMENTS

Figure 4:
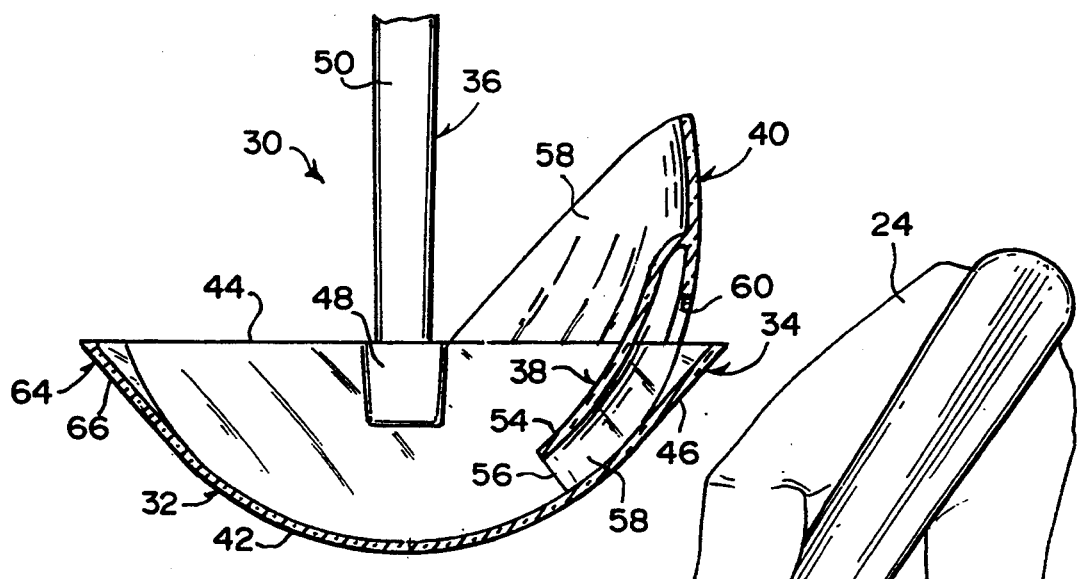
FIG. 4 is an enlarged cross sectional view taken along line 4—4 in FIG. 3, showing the built in separator gate and spillage guard in greater detail.
Figure 5:
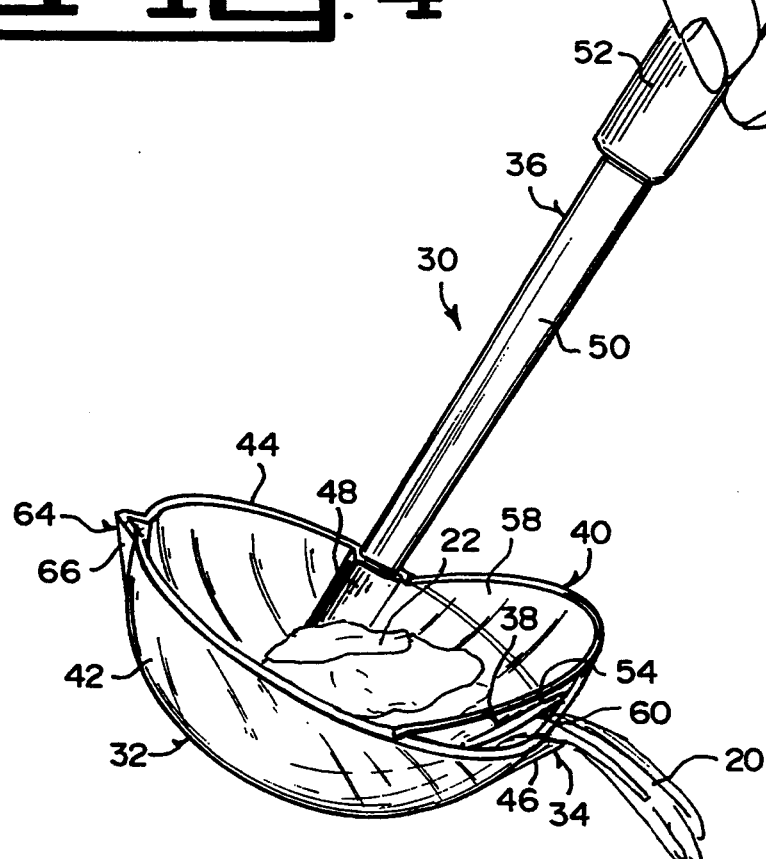
FIG. 5 is a front perspective view showing the instant invention being used to pour the liquid therefrom.

Turning now descriptively to the drawings, in which similar reference characters denote similar elements throughout the several views, FIG. 1 illustrates the prior art being a standard ladle 10 having a handle 12 and a bowl 14. A pot 16 sitting on a stove 18 contains a hot liquid 20, such as soup, with fatty oil 22 mixed therein. A first hand 24 of a person is gripping the handle 12 and pouring some of the hot liquid 20 with the fatty oil 22 from the bowl 14 into a cup 26 held by a second hand 28 of the person.

The instant invention shown in FIGS. 2 through 5 is a skimming ladle 30, which consists of a bowl 32 that is capable of holding the liquid 20 with the fatty oil 22 therein. A spout 34 is formed on one side of the bowl 32. A handle 36 that is fixed to the bowl 32 extends therefrom for manipulation of the bowl 32. A structure 38 in the bowl is for guiding the liquid 20 away from the fatty oil 22, when the liquid 20 is poured out of the spout 34, so that the liquid 20 will be free of the fatty oil 22 when exiting the spout 34.

A component 40 is for preventing spillage of the fatty oil 22 out of the bowl 32, when the liquid 20 is poured out of the spout 34. The bowl 32 contains a substantially hemispherical concave wall configuration 42, with a circular upper edge 44 thereabout. The spout 34 is a substantially V-shaped wall configuration 46, located at the circular upper edge 44 of the bowl 32.

The bowl 32 further includes a socket portion 48 located at the circular upper edge 44 of the bowl 32 at a ninety degree location from the spout 34. The handle 36 consists of a shank portion 50 having a bottom end in engagement with the socket portion 48 of the bowl 32. A hand grip portion 52 is located on a top end of the shank portion 50, to be gripped by a hand 54 of a person using the skimming ladle 30.

The liquid guiding structure 38 is a V-shaped separator gate 54 built into the bowl 32 behind the spout 34. The separator gate 54 has a bottom aperture 56, so as to define a passageway 58 for the liquid 20 in the bowl 32 to exit from the spout 34 below the fatty oil 22 floating on top of the liquid, as best seen in FIG. 4. The spillage preventing component 40 is a half dome shaped guard member 58, extending upwardly from the circular upper edge 44 of the bowl 32 above the spout 34. The guard member 58 has an opening 60 therethrough at the spout 34 and in front of the separator gate 54, so as to allow the liquid 20 to exit from the spout 34.

The bowl 32, the spout 34, the separator gate 54 and the guard member 58 can be integral and fabricated out of a durable material 62. The durable material 62 can be made out of a one piece clear plastic construction, so as to make it easy to see when to stop pouring the liquid 20 out of the spout 34 and keep all of the fatty oil 22 within the bowl 32.

A second spout 64 is also provided, being of a substantially V-shaped wall configuration 66 and is located at the circular upper edge 44 of the bowl 32 opposite from the first spout 34. A person can utilize the second spout 64 in a normal fashion on the bowl 32 for pouring other types of fat free liquids therefrom.

OPERATION OF THE INVENTION

To use the skimming ladle 30 the following steps should be taken:

1. Grip the hand grip portion 52 of the handle 36 by a first hand 24.
2. Dip the bowl 32 into the liquid 20 with the fatty oil 22 that is in the pot 16.
3. Remove the bowl 32 with some of the liquid 20 with the fatty oil 22 from the pot 16.
4. Tip the handle 36 so that the liquid 20 in the bowl 32 will exit the first spout 34 via the separator gate 54.
5. Make sure that the fatty oil 22 floating on top of the liquid 20 stays within the bowl 32 and the guard member 58.

LIST OF REFERENCE NUMBERS 10 standard ladle
12 handle of 10
14 bowl of 10
16 pot
18 stove
20 hot liquid (soup)
22 fatty oil
24 first hand
26 cup
28 second hand
30 skimming ladle
32 bowl of 30
34 spout of 30
36 handle of 30
38 liquid guiding structure
40 spillage preventing component
42 hemispherical concave wall configuration of 32
44 circular upper edge of 32
46 V-shaped wall configuration of 34
48 socket portion of 32
50 shank portion of 36
52 hand grip portion of 36
54 V-shaped separator gate for 38
56 button aperture of 54
58 half dome shaped guard member for 40
60 opening in 58
62 durable material
64 second spout
66 V-shaped wall configuration of 64

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A skimming ladle comprising:
    a) a bowl that is capable of holding a liquid with a fatty oil therein, said bowl including a substantially hemispherical concave wall configuration with a circular upper edge thereabout, said bowl further including a socket portion located at said circular upper ledge of said bowl at a ninety degree location from a spout;
    b) said spout formed on one side of said bowl, said spout including a substantially V-shaped wall configuration located at said circular upper edge of said bowl;
    c) a handle that is fixed to said bowl, extends therefrom for manipulation of said bowl, said handle including a shank portion having a bottom end in engagement with said socket portion of said bowl and a hand grip portion located on a top end of said shank portion to be gripped by a hand of a person using said skimming ladle;
    d) means in said bowl for guiding the liquid away from the fatty oil when the liquid is poured out of said spout, so that the liquid will be free of the fatty oil when exiting said spout, said liquid guiding means including a V-shaped separator gate built into said bowl behind said spout, said separator gate having a bottom aperture so as to define a passageway for the liquid in said bowl to exit from said spout below the fatty oil floating on top of the liquid;
    e) means for preventing spillage of the fatty oil out of said bowl when the liquid is poured out of said spout, said spillage preventing means including a half dome shaped guard member extending upwardly from said circular upper edge of said bowl above said spout, said guard member having an opening therethrough at said spout and in front of said separator gate, so as to allow the liquid to exit from said spout; and f) said bowl, said spout, said separator gate and said guard member being integral and fabricated out of a durable material said durable material being made out of a one piece clear plastic construction, so as to make it easy to see when to stop pouring the liquid out of said spout and keep all of the fatty oil within said bowl.

2. A skimming ladle as recited in claim 1, further including a second spout being of a substantially V-shaped wall configuration located at said circular upper edge of said bowl opposite from said first spout, so that a person can utilize said second spout in a normal fashion on said bowl, for pouring other types of fat free liquids therefrom.

* * * * *